Dec. 6, 1955   R. I. BINDER   2,725,965
DISENGAGING BEARING FOR CLUTCHES
Filed June 2, 1953

INVENTOR
Richard Binder
By Richardson, David and Nordn
his ATTYS.

United States Patent Office 2,725,965
Patented Dec. 6, 1955

2,725,965

DISENGAGING BEARING FOR CLUTCHES

Richard Ignatz Binder, Schweinfurt (Main), Germany, assignor to Firma Fichtel & Sachs A. G., Schweinfurt (Main), Germany Application June 2, 1953, Serial No. 359,057

Claims priority, application Germany February 4, 1953

5 Claims. (Cl. 192—98)

Disengaging bearings are known, especially for motor vehicles, in which ball bearings are used for the disengagement and in which a thrust ring is fixed to the rotating race member of the ball bearing, said ring taking up the radial movements which occur in the case of eccentric positioning of the ball bearing with respect to the coupling by sliding friction. In known constructions the thrust ring is set in the inner diameter, which presupposes the use of a material having sufficiently great strength and toughness. In many cases running difficulties and especially the development of considerable noise result from the use of such materials.

According to the invention the thrust ring is made from carbon, graphite or similar very brittle material and this ring, which is in danger of being fractured, is so secured that it is surrounded at its external periphery. It is preferable to stick the ring into the surrounding part additionally by a binding medium, as for example Bakelite, preferably under the action of heat. Such a thrust ring causes no noises arising from the friction between the ring and the counter surface. The ring can have a simple rectangular cross-sectional form. It is surrounded by a bushing fixed to the rotatable bearing race member, said bushing also forming a packing of the side of the bearing remote from the thrust ring.

A constructional example of thrust ring bearing according to the invention is shown in the accompanying drawing, wherein.

Figure 1:
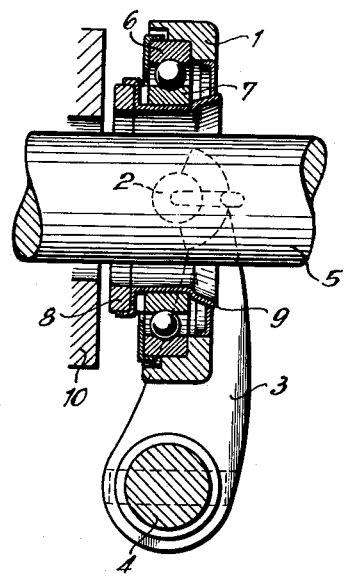
Figure 1 shows the bearing in axial section.
Figure 2:
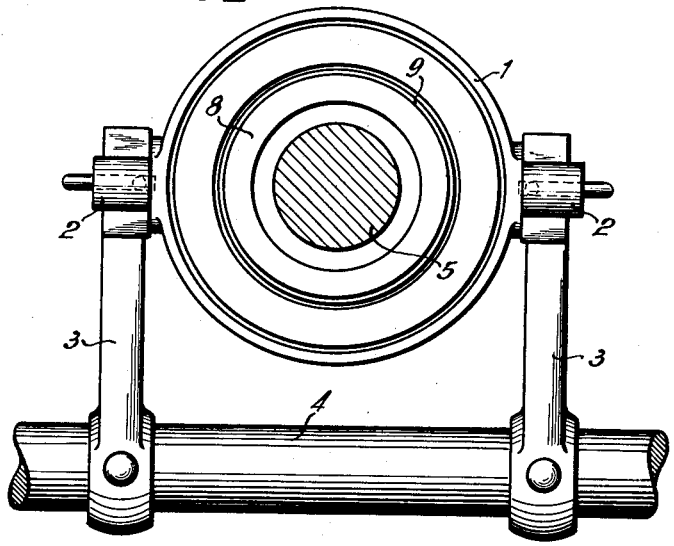
Figure 2 is a view in a plane perpendicular to Figure 1.

The disengaging bearing consists of a casing 1, which is provided with the pivot 2 and a ball bearing. Swinging levers 3, which are fixed to the shaft 4, engage the pivot 2. The shaft transmits the pressure of the clutch pedal to the disengaging bearing. The casing 1 swings about the axis of the shaft 4 and is not centered on the coupling shaft 5. The outer race ring 6 of the ball bearing 1 is positioned in the casing 1. The thrust ring 8 is fixed by a bushing 9 in the inner race ring 7 of the ball bearing. The thrust ring 8 has a rectangular cross-sectional form and is surrounded on its external periphery by the bushing 9.

The surrounding of the thrust ring by the bushing 9 as well as the simple rectangular cross-sectional shape of said ring, make it possible to use fragile, brittle material, such as carbon, graphite or the like. During disengagement of the clutch the thrust ring 8 presses against the disengaging ring 10 of the movable clutch member.

I claim:

1. A disengaging bearing for clutches especially for motor vehicles, comprising a coupling shaft, a ball bearing surrounding said coupling shaft and having stationary and rotatable ball race members, a bushing secured to the rotatable ball race member, and a butting thrust ring arranged to take up radial displacement of the ball bearing relatively to the coupling shaft by sliding friction, said bushing having an integral part surrounding the external periphery of the ring whereby the latter is connected to the rotatable race member for rotation therewith.

2. A bearing according to claim 1, wherein said butting thrust ring is formed of a relatively fragile substance chosen from the class consisting of carbon and graphite.

3. A bearing according to claim 1, wherein said thrust ring has a rectangular cross-section.

4. A bearing according to claim 1, wherein the inner race member is provided with a central bore and said bushing is secured within said bore.

5. A bearing according to claim 1, wherein said bushing serves as a packing at the side of the rotatable race member remote from the thrust ring.

References Cited in the file of this patent

UNITED STATES PATENTS

| 1,788,864 | Geistert | Jan. 13, 1931 |

FOREIGN PATENTS

| 531,046 | Great Britain | Dec. 27, 1940 |
| 587,299 | Great Britain | Apr. 21, 1947 |
| 927,347 | France | Apr. 28, 1947 |